(12) United States Patent
Niauzorau et al.

(10) Patent No.: US 11,980,936 B2
(45) Date of Patent: May 14, 2024

(54) SYNTHESIS OF NANOSCALE METAL FEEDSTOCK FOR ADDITIVE MANUFACTURING

(71) Applicants: Stanislau Niauzorau, Gilbert, AZ (US); Aliaksandr Sharstniou, Gilbert, AZ (US); Amm G. Hasib, Tempe, AZ (US); Bruno Azeredo, Tempe, AZ (US); Natalya Kublik, Tempe, AZ (US); Kenan Song, Gilbert, AZ (US); Nikhilesh Chawla, West Lafayette, IN (US); Sridhar Niverty, West Lafayette, IN (US)

(72) Inventors: Stanislau Niauzorau, Gilbert, AZ (US); Aliaksandr Sharstniou, Gilbert, AZ (US); Amm G. Hasib, Tempe, AZ (US); Bruno Azeredo, Tempe, AZ (US); Natalya Kublik, Tempe, AZ (US); Kenan Song, Gilbert, AZ (US); Nikhilesh Chawla, West Lafayette, IN (US); Sridhar Niverty, West Lafayette, IN (US)

(73) Assignees: Arizona Board of Regents on behalf of Arizona State University, Scottsdale, AZ (US); Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/841,371

(22) Filed: Jun. 15, 2022

(65) Prior Publication Data
US 2022/0402024 A1    Dec. 22, 2022

Related U.S. Application Data

(60) Provisional application No. 63/211,393, filed on Jun. 16, 2021.

(51) Int. Cl.
B22F 1/10 (2022.01)
B22F 1/05 (2022.01)
(Continued)

(52) U.S. Cl.
CPC .................. *B22F 1/10* (2022.01); *B22F 1/05* (2022.01); *B22F 1/145* (2022.01); *B22F 10/18* (2021.01);
(Continued)

(58) Field of Classification Search
CPC .... B22F 1/10; B22F 1/05; B22F 1/145; B22F 10/18; B22F 2301/10; B22F 1/052;
(Continued)

(56) References Cited

U.S. PATENT DOCUMENTS

2023/0124780 A1* 4/2023 Huang .................. B33Y 70/00

OTHER PUBLICATIONS

Chuang et al. Challenges and Opportunities for Integrating Dealloying Methods into Additive Manufacturing, Materials 2020, 13, 3706; doi:10.3390/ma13173706, Aug. 21, 2020 (Year: 2020).*
(Continued)

*Primary Examiner* — Rebecca Janssen
(74) *Attorney, Agent, or Firm* — Fish & Richardson P.C.

(57) ABSTRACT

A method of making a metal-polymer composite includes dealloying metallic powder to yield porous metal particles, monitoring a temperature of the mixture, controlling the rate of combining, a maximum temperature of the mixture, or both, and combining the porous metal particles with a polymer to yield a composite. Dealloying includes combining the metallic powder with an etchant to yield a mixture. A metal-polymer composite includes porous metal particles having an average particle size of about 0.2 μm to about 500 μm and a thermoplastic or thermoset polymer. The polymer composite comprises at least 10 vol % of the porous metal particles. A powder mixture includes porous metal particles
(Continued)

having an average particle size of about 0.2 μm to about 500 μm and a metal powder. The powder mixture includes about 1 wt % to about 99 wt % of the porous metal particles.

21 Claims, 1 Drawing Sheet

(51) Int. Cl.
 B22F 1/145 (2022.01)
 B22F 10/18 (2021.01)
 B33Y 10/00 (2015.01)
 B33Y 40/10 (2020.01)
 B33Y 70/10 (2020.01)
(52) U.S. Cl.
 CPC .............. *B33Y 10/00* (2014.12); *B33Y 40/10* (2020.01); *B33Y 70/10* (2020.01); *B22F 2301/10* (2013.01)
(58) Field of Classification Search
 CPC ........ B22F 1/107; B22F 5/12; B22F 2998/10; B22F 2998/00; B22F 10/28; B22F 10/25; B22F 10/12; B22F 10/14; B22F 3/225; B22F 2009/0824; B22F 3/227; B22F 3/1021; B33Y 10/00; B33Y 40/10; B33Y 70/10; C22C 1/0425
 See application file for complete search history.

(56) References Cited

OTHER PUBLICATIONS

Guo et al., "Liquid metals dealloying as a general approach for the selective extraction of metals and the fabrication of nanoporous metals: a review," Materials Today Communications 26 (Jan. 6, 2021) 102007 (Year: 2021).*
Wang et al., "Fabrication of novel nanoporous copper powder catalyst by dealloying of ZrCuNiAl amorphous powders for the application of wastewater treatments," Journal of Hazardous Materials, 2017, 340:445-453, from IDS (Year: 2017).*
Dan et al., "Evolution of Nanoporous Surface Layers on Gas-Atomized Ti60Cu39Au 1 Powders during Dealloying," Nanomaterials, 2018, 8(8):581, 16 pages.
Erlebacher et al., "Evolution of nanoporosity in dealloying," Nature, 2001, 410:450-453.
Ide et al., "Metal-metal bonding process using Ag metallo-organic nanoparticles," Acta Materialia, 2005, 53(8):2385-2393.
Jiang et al., "Tin/Silver/Copper Alloy Nanoparticle Pastes for Low Temperature Lead-free Interconnect Applications," 2008 58th Electronic Components and Technology Conference, Lake Buena Vista, FL, USA, May 27-30, 2008, pp. 1400-1404.
Liu et al., "Recent progress in rapid sintering of nanosilver for electronics applications," Micromachines, 2018, 9:346, 17 pages.
Sohn et al., "Preparation of conducting silver paste with Ag nanoparticles prepared by e-beam irradiation," Radiation Physics and Chemistry, 2010, 79(11):1149-1153.
Wang et al., "Fabrication of novel nanoporous copper powder catalyst by dealloying of ZrCuNiAl amorphous powders for the application of wastewater treatments," Journal of Hazardous Materials, 2017, 340:445-453.

* cited by examiner

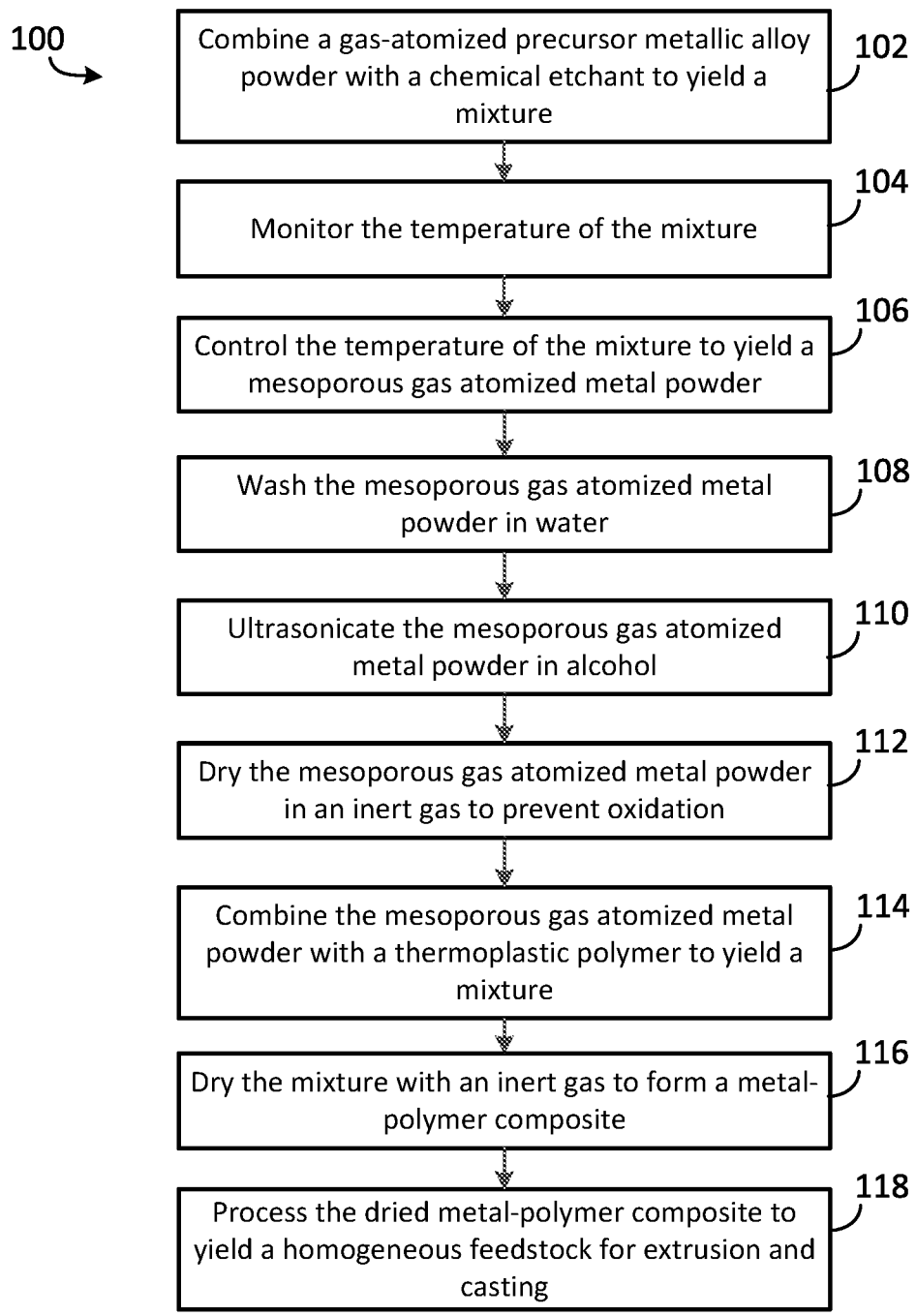

SYNTHESIS OF NANOSCALE METAL FEEDSTOCK FOR ADDITIVE MANUFACTURING

CROSS-REFERENCE TO RELATED APPLICATION

This application claims the benefit of U.S. Patent Application No. 63/211,393 filed on Jun. 16, 2021, which is incorporated herein by reference in its entirety.

STATEMENT OF GOVERNMENT SUPPORT

This invention was made with government support under 1932899 awarded by the National Science Foundation. The government has certain rights in the invention.

TECHNICAL FIELD

This invention relates synthesis of nanoscale metal feedstock with low-temperature sinterability and light-absorptivity properties and its deployment for additive manufacturing (3D printing) of high-density metal and polymers at compatible temperatures.

BACKGROUND

Additive manufacturing, commonly known as three-dimensional (3D) printing, is a manufacturing technique that builds an object by depositing, joining, or solidifying material in a layer-by-layer manner. 3D printing has advantages over traditional manufacturing with respect to rapid prototyping, complicated design, and material sustainability.

SUMMARY

This disclosure describes synthesis of metal-polymer composites as well as the resulting metal-polymer composites. In particular, synthesis of mesoporous gas atomized metal (MGAM) powders, MGAM powders, compositions including MGAM powders, and uses of MGAM powders are described. MGAM powders are synthesized by chemical dealloying technique with sub-100 nm ligament sizes. This nanoporous feedstock can be synthesized in kilogram scales and subsequently integrated with manufacturing processes such as additive manufacturing (3D printing), including fused filament fabrication (FFF), powder bed fusion, directed energy deposition, ultrasonic-based 3D printing and metal binder jetting, and powder casting and injection into open and closed dies in combination with low-temperature sintering. MGAM powders with ligament size in the sub-100 nm exhibit low temperature sinterability characteristics and can be welded at a third of the melting temperature via solid state welding processes such as thermal sintering, spark plasma sintering, and ultrasonic-based welding. Further, MGAM powders can absorb light up to 200% more efficiently than solid counterparts and reduce reflected power in powder bed fusion processes and directed energy deposition.

The low-temperature sintering characteristics of MGAM powders allows extrusion, printing, casting, sintering, and consolidating the feedstock at sub-400° C. temperatures. This low temperature sintering for metals such as copper (with a melting point of 1000-1100° C.) makes it compatible with the concomitant printing of polymers whose degradation temperatures are higher than 400° C. After sintering, the metal is electrically conductive and solid, and thus suitable for the manufacture of embedded circuits. The flowability of the feedstock is advantageous in the fabrication of filaments (polymer matrix metal composites) with a high packing factor of metals (>60% by volume) that yield 3D printed objects via FFF that retain their shape during sintering steps.

The MGAM powders facilitate 3D printing of metals (e.g., copper, nickel) at processing temperatures that are compatible with high-temperature polymers, since the polymer will not degrade, char, or sublime if the metal is consolidated at temperature below 450° C. Retaining the round shape of the MGAM powders during dealloying allows MGAM powders to preserve flowability and avoid agglomeration and interlocking during integration with additive manufacturing technologies. This is advantageous since additive manufacturing technologies (e.g., FFF printing or powder bed fusion) rely at least in part on flowability characteristics of gas-atomized powders. The MGAM powders are also suitable for a variety of powder metallurgy applications, including other 3D printing processes, metal powder casting, and injection molding.

In a first general aspect, a method of making a metal-polymer composite includes dealloying metallic powder to yield porous metal particles, monitoring a temperature of the mixture, controlling the rate of combining, a maximum temperature of the mixture, or both, and combining the porous metal particles with a polymer to yield a composite. The dealloying includes combining the metallic powder with an etchant to yield a mixture. Implementations of the first general aspect can include one or more of the following features.

The metallic powder can include a copper-aluminum alloy. The metallic powder can include mesoporous copper particles. In some implementations, the etchant includes an acid or a base. Controlling the rate of addition of the metallic powder can include controlling the rate of addition of the metallic powder to the etchant. Controlling the rate of addition of the metallic powder can include titrating the metal powder into the etchant or the etchant into the powder. In some implementations, the temperature of the mixture is in a range from 0° C. to 100° C. In certain implementations, the maximum temperature of the mixture is 95° C. In some implementations, the maximum temperature of the mixture is 90° C. The maximum temperature of the mixture can be 85° C. The maximum temperature of the mixture can be 80° C. In some implementations, the polymer is at least partially solubilized in a solvent and mixed with MGAM powders. The composite can be homogeneous. In some implementations the composite is in the form of a paste. The composite can include at least 10 vol % of the porous metal particles. In some implementations, the method includes drying the composite. The method can include extruding the composite. Extruding the composite can yield a composite filament. The method can include 3D printing the composite filament. 3D printing the composite can include fused material deposition and binder jetting. In some cases, the method includes sintering the 3D printed composite filament at a temperature less than 450° C. The metal particles can include the following metals or their alloys: copper, titanium, tungsten, aluminum, gold, rhenium, palladium, platinum, lithium, magnesium, cobalt, chromium, manganese, vanadium, zirconium, niobium, molybdenum, tantalum, hafnium, silicon, germanium, gallium, tin, indium or nickel.

In a second general aspect, a metal-polymer composite includes porous metal particles having an average particle size of about 0.2 μm to about 500 μm and a thermoplastic or thermoset polymer. The composite can include at least 10 vol % of the porous metal particles.

Implementations of the second general aspect can include one or more of the following features.

The metal nanoparticles can have an average ligament size of 100 nm or less. A sintering temperature of the composite can be less than 450° C. The metal particles can include the following metals or their alloys: copper, titanium, tungsten, aluminum, gold, rhenium, palladium, platinum, lithium, magnesium, cobalt, chromium, manganese, vanadium, zirconium, niobium, molybdenum, tantalum, hafnium, silicon, germanium, gallium, tin, indium or nickel. In some cases, the polymer is a thermoset. A 3D printed article can include the composite. The 3D printed article can include an additional material. In some implementations, the additional material includes a polymer that is free of metal particles. A method of 3D printing can include the composite. The method can include printing an additional material that is different than the composite. In some cases, the additional material is free of MGAM powders.

In a third general aspect, a powder mixture includes porous metal particles having an average particle size of about 0.2 μm to about 500 μm and a metal powder having a particle size of about 0.001 μm to about 500 μm. The powder mixture can include about 0 wt % to about 100 wt % (e.g., about 1 wt % to about 99 wt %) of the porous metal particles.

In a fourth general aspect, MGAM powders in their dry and pure state are directly used in powder casting and injection (e.g., without mixing it into a composite) by placing powders in a ceramic mold and sintering at 200-800° C. in a reducing atmosphere (e.g., an atmosphere that includes a mixture of argon and hydrogen or other gaseous mixtures containing a reducing agent).

In a fifth general aspect, MGAM powders in their dry and pure state are directly used in metal additive manufacturing processes based on powders (e.g., without mixing it into a composite) such as selective laser melting, directed energy deposition or binder jetting. MGAM can be pre-mixed with metal nanoparticles ranging in sizes from 1-2,000 nanometers as a reinforcement agent. The method may include sintering the 3D printed parts at 200-800° C. in reducing atmospheres (e.g., an atmosphere that includes a mixture of argon and hydrogen or other gaseous mixtures containing a reducing agent).

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

The FIGURE is a flow chart showing operations in a process of synthesizing mesoporous gas atomized metal-polymer composites.

DETAILED DESCRIPTION

This disclosure describes synthesis of mesoporous gas atomized metal (MGAM) powders, the resulting MGAM powders, compositions including the MGAM powders, and uses of the MGAM powders (e.g., as feedstock for additive manufacturing). Suitable uses include selective laser melting, directed energy deposition, fused deposition modeling, ultrasonic-based printing, plating-based printing and binder jetting. The low sinterability of MGAM powders, which results in reduced energy density and temperatures required for consolidating these powders into a solid, is advantageous in these processes.

The MGAM powders have nanoscale structural features (i.e., ligaments) with sizes ranging from 2 to 1500 nm, which contribute to a low sintering temperature. Additionally, after chemical treatment, the MGAM powders retain their original shape during dealloying (i.e., porosification). Since the powders are gas-atomized (i.e., initially round in shape with high-flowability), their flowability remains high after porosification (by dealloying), which makes them readily integratable for use in fused deposition modeling, stereolithography (SLA), selective laser and electron-beam melting, binder jetting, directed energy deposition, powder casting, powder injection molding, and other additive manufacturing techniques.

The gas-atomized powders include porous metal particles having an average particle size of about 1 μm to about 500 μm. As used herein, "particle size" refers to the longest linear dimension (e.g., a maximum length or a maximum diameter) of a particle. In some embodiments, the porous metal particles have an average particle size between about 0.2 μm and about 500 μm, between about 1 μm and about 100 μm, or between about 1 μm and about 10 μm.

In one example, synthesizing a MGAM powder includes subjecting a gas-atomized powder to a chemical dealloying treatment. The chemical dealloying treatment includes treatment of gas-atomized powder with alkaline or acidic etchants to yield a MGAM powder. A wide selection of alloys are compatible with this synthesis method provided one or more elements in the alloy are more noble and will not be etched, and one or more elements are less noble and will be etched. Typically, Cu, Ni, Ti, W are examples of more noble elements and Zn, Al and Mg are examples of less noble elements. Heat generation caused by the exothermic reaction of the metal etching is controlled by combining the gas-atomized powder with the etchant at a selected titration rate, quenching heat generated by the exothermic reaction, or both. Quenching heat generated by the exothermic reaction can include cooling the reaction mixture (e.g., in an ice bath).

The FIGURE is a flow chart showing operations in process 100 for synthesizing mesoporous gas atomized metal-polymer composites. In 102, control of ligament sizes (e.g., to less than 100 nm) can be achieved by titrating the addition of the gas-atomized powder (the metal precursor) to the etchant or by the addition of the etchant to a beaker containing the metal powder to yield a reaction mixture. The ligament sizes can also be controlled in 104 by monitoring the temperature of the reaction mixture, and controlling the temperature of the reaction in 106 by cooling the reaction mixture (e.g., in an ice-bath) to quench heat generated by the exothermic reaction of the metal etching. In some cases, a maximum temperature of the reactant mixture is in the range from 30 to 90° C. The reduced heating and peak temperatures result in reduced coarsening of the porous metal structure into larger ligaments, and therefore smaller ligament sizes. The resulting MGAM powder can be washed in water in 108, ultrasonicated in alcohol in 110, and kept wet in alcohol or dried in an inert gas atmosphere to prevent oxidation in 112.

In some implementations, the MGAM powder from 112 is used directly in its dry and pure state in powder casting and injection (e.g., without mixing it into a composite) by placing the MGAM powder in a ceramic mold and sintering at 200-800° C. in a reducing atmosphere (e.g., an atmosphere that includes a mixture of argon and hydrogen or other gaseous mixtures containing a reducing agent). In certain implementations, the MGAM powder from 112 is used directly in its dry and pure state in metal additive manufacturing processes based on powders (e.g., without forming a composite). Examples of suitable metal additive manufacturing processes include selective laser melting, directed energy deposition, or binder jetting. The MGAM powder can be pre-mixed with metal nanoparticles having an average particle size in a range of about 1 nm to about 2,000 nm as a reinforcement agent. A metal additive manufacturing process can include sintering 3D printed parts at 200-800° C. in a reducing atmosphere (e.g., an atmosphere that includes a mixture of argon and hydrogen or other gaseous mixtures containing a reducing agent).

In some implementations, the MGAM powder from 112 is combined with a thermoplastic polymer solution to yield a mixture in 114. The thermoplastic polymer solution includes a thermoplastic polymer (e.g., polylactic acid (PLA) or acrylonitrile butadiene styrene) and a solvent (e.g., dichloromethane or tetrahydrofuran). The mixture is typically in the form of a paste. The mixture is dried to yield a composite in 116. The composite typically includes at least 10 vol % of the MGAM powder, but ideally in the 50-70 vol % range. The dried composite can be processed (e.g., extruded) to yield a homogeneous feedstock for extrusion, casting and forming of MGAM powder-containing composite in 118. In some cases, the feedstock is in the form of filaments for integration with fused filament fabrication (FFF). The filaments can be wound and used for 3D printing (e.g., by loading the wound filaments on an FFF feed core) to yield printed porous metal-polymer composites.

The MGAM feedstock can be integrated with FFF printing to combine advantages of low-temperature sinterability and high-flowability of MGAM to enable co-printing of polymers and MGAM filaments. The low-temperature sinterability characteristics of MGAM can be exploited to print and consolidate the resulting printed feedstock at sub-400° C. temperatures. As such, polymer and MGAM filaments with degradation temperatures higher than 400° C. can be printed at the same time, effectively embedding the conductive metal onto polymeric parts, highlighting the compatibility and feasibility of using MGAM for multi-material printing (i.e. polymer and metal co-printing). Additionally, the flowability of the feedstock results in filaments with high packing factor of metals (>50% by vol) that yield 3D printed objects that retain their shape during sintering steps.

The porous metal-polymer composites have a low sinterability temperature and show onset of welding at temperatures lower than the melting temperature of the composite (e.g., around 400° C.). Thus, sintering of nanoporous copper into the sub-400° C. range with advantageous electrical conductivity is achieved while consolidating the feed stock into a porous solid.

The resulting MGAM metal powder can alternatively be dry mixed with solid gas-atomized metal powder in fractions ranging from about 0 wt % to about 100 wt % (e.g., about 1 wt % to about 99 wt %) to obtain a dry powder mixture containing MGAM. The metal or alloy selection for the porous and solid powders is vast and must follow user-driven material and alloy design strategies. Solid powders may include nanoparticles made of metals as a reinforcing agent. This powder mixture is used as a feedstock to different additive manufacturing machines such as selective laser, binder-jetting, electron-beam melting or directed energy deposition. Mixtures containing 1-100 wt % (e.g., about 1 wt % to about 99 wt %) of MGAM powders are highly anti-reflective and yield advantageous light absorption characteristics that help reduce the reflected power from light-driven power sources and more efficiently heat and print the metal with high relative densities as is the case of selective laser melting and directed energy deposition. In the selective laser melting and directed energy deposition application, the use of dry mixtures of gas-atomized powders containing MGAM powders can yield either (i) solid objects (e.g., if printed at high energy densities) since the nanopores in MGAM powders are fully melted during printing and only used to improve light-absorption which can reduce altogether the high-power requirements of metal additive to either print faster or with less power, (ii) porous objects (e.g., if printed at low energy densities), or (iii) objects containing voxelated combinations of porous and solid matter.

EXAMPLES

Materials. Commercially available copper-aluminum gas atomized powders (33 at % of Cu) were purchased from Valimet. The powder size distribution was D10: 4.36 μm, D50: 11.76 μm, D90: 28.55 μm.

Porous Cu Powder #1. Large scale porous powders fabrication was conducted in an ice bath by titration of the precursor alloy at controlled rates in order to avoid excessive heat generation during dealloying, which occurs due to the exothermic etching reaction of the aluminum. A thermocouple was placed inside the etch bath for the whole duration of synthesis to monitor the maximum temperature. A 1 L Erlenmeyer flask was filled with 3M HCl and placed into an ice bath. The synthesis was initiated when the solution temperature reached equilibrium with ice bath temperature. Maximum temperatures did not to exceed 80° C. and slower titration was employed if overheating occurred. Overheating leads to thermal coarsening of powders, which increase the ligament size and is expected to reduce low-sinterability characteristics. The ratio of powder to solution was maintained at 1 g of powder for 15 mL of solution.

Porous Cu Powder #2. A beaker with 3M NaOH was placed on a hotplate. A thermocouple was placed inside the etch bath for the whole duration of the synthesis to monitor temperature. The NaOH solution was heated to 50° C., and the maximum recorded temperature was 95° C. After titration of the powders into solution, dealloying was maintained until no bubbles were observed. The ratio of powder to solution was maintained at 1 g of powder for 15 mL of solution. An ice bath was not needed.

Dealloying. Powders were slowly titrated with respect to temperature monitoring to prevent thermal runaway reaction and excessive hydrogen gas generation. 1 g of powder was added every minute for Powder #1 and 0.3 g of powder was added every 10 s for Powder #2. Dealloying was maintained until no hydrogen gas bubbles were observed (typically 2.5 hrs and 15 min for Powders #1 and #2, respectively). After dealloying, the powders were washed several times with deionized water and ultrasonicated in dehydrated alcohol. Powders were kept wet in alcohol or dried in an argon atmosphere to prevent oxidation.

Filament Extrusion and FFF Printing. Freshly dealloyed mesoporous metal powder was mixed with a thermoplastic polymer (e.g., PLA) from 50 to 56 vol % of precursor metal. To attain a homogenous distribution of porous metals inside the polymer matrix, polymers were dissolved in a solvent (dichloromethane or tetrahydrofuran for PLA). Porous metal powders wetted in a solvent (to prevent exposure to air) were added into the dissolved polymer solution and mechanically stirred to dispersing the particles homogeneously. Water entrapped inside the porous powder would result in issues during this mixing step since the dichloromethane and water are immiscible. After all the porous metals were added and well mixed with the polymers, the thick paste like solution was dried. The PLA and porous metal mixture turned into a solid chunk and was chopped into small (e.g., approx. 0.5 cm in size) pieces to be fed into the extrusion feed hopper.

Inside the extruder, the feedstocks were heated to temperatures above the melting point and the shearing action of the extruder screw provides additional mixing. Filaments of a pre-defined diameter (limited by the extruder die size) were continuously collected from the extruder nozzle without interruption and simultaneously wound. The wound filaments were loaded to the FFF (3D printer) feed core. The printing characteristics of the filaments are attributed in part to the homogeneity achieved during the metal-polymer mixing strategy and to the retained flowability of the MGAM powders, which present relatively low viscosities when well dispersed. Multiple 3D printed porous metal-polymer composites were printed with this method.

Porous Cu gas atomized powders were used for production of metal infused filaments and printing metal/polymer composites. The porous Cu powders advantageously exhibit lower sinterability temperature and have shown onset of welding (i.e. necking formation) at temperatures lower than the melting temperature (i.e. ~250-400° C.). The latter have been analyzed by Differential Scanning calorimetry, and the data revealed that the range of solid state recrystallization is from 100° C. to 300° C. Sintering parts are electrically conductive, which indicates that solid contact exists between porous Cu powders. Additional analysis was performed via scanning electron microscopy (SEM) in which welded porous powders were cross-sectioned by a focused-ion beam to observe the necking formation between them. A necking formed and the ligaments bridged across the interface of the powder. In one test, the MGAM powder was dispersed on a nanoporous gold film. This allowed assessment of the extent of inter-atomic diffusion which could be measured by FIB cross-sectioning the sintered powder and film and analyzing the concentration profiles formed during sintering via EDS mapping of copper and gold content. Interdiffusion across the interface at reduced temperatures of 400° C. was observed.

Selective Laser Melting of Solid and Porous Metals. As an example of the use of dry-powder mixtures (mixed at low-energies in a planetary mixing machine) containing MGAM powders in metal additive manufacturing via selective laser melting. At high energy densities, pure copper metal parts were 3D printed with relative densities greater than 96%. At low energy densities, porous metal parts were printed with retained nanoporosity. The precursor used was solid copper powder mixed with 5-10 wt % of added MGAM powders. The solid copper powder used was either microsized obtained from gas atomization or nanosized. The mixture containing 5 wt % of MGAM powder yielded higher density parts than those printed under the same conditions with pure copper gas-atomized powders (i.e. without MGAM powders) highlighting their effectiveness in producing dense metal parts.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of making a metal-polymer composite, the method comprising:
   dealloying metallic powder to yield porous metal particles, wherein dealloying comprises combining the metallic powder with an acid or a base to yield a mixture;
   monitoring a temperature of the mixture;
   controlling the rate of combining the metallic powder with the acid or the base; and
   combining the porous metal particles with a polymer to yield a composite.

2. The method of claim 1, wherein the metallic powder comprises a copper-aluminum alloy.

3. The method of claim 2, wherein the porous metal particles comprise mesoporous copper particles.

4. The method of claim 1, wherein controlling the rate of combining the metallic powder with the acid or the base comprises controlling the rate of addition of the metallic powder to the acid or the base.

5. The method of claim 4, wherein controlling the rate of addition of the metallic powder comprises titrating the metallic powder into the acid or the base or the acid or the base into the metallic powder.

6. The method of claim 1, wherein a temperature of the mixture is in a range from 0° C. to 100° C.

7. The method of claim 1, wherein the polymer is at least partially solubilized in a solvent.

8. The method of claim 1, wherein the composite is homogenous.

9. The method of claim 1, wherein the composite is in the form of a paste.

10. The method of claim 1, wherein the composite comprises at least 10 vol % of the porous metal particles.

11. The method of claim 1, further comprising drying the composite.

12. The method of claim 1, further comprising extruding the composite.

13. The method of claim 12, wherein extruding the composite yields a composite filament.

14. The method of claim 13, further comprising 3D printing the composite filament to yield a 3D printed composite filament.

15. The method of claim 14, wherein 3D printing the composite filament comprises fused material deposition.

16. The method of claim 14, further comprising sintering the 3D printed composite filament at a temperature less than 450° C.

17. The method of claim 1, wherein the metallic powder comprises gas-atomized powder.

18. The method of claim 17, wherein the porous metal particles have an average particle size of about 0.2 μm to about 500 μm.

19. The method of claim 1, further comprising cooling the mixture.

20. The method of claim 1, wherein the temperature of the mixture does not exceed 80° C.

21. The method of claim 1, wherein a maximum value of the temperature of the mixture is 95° C.

* * * * *